J. C. STROUD.
Wheel Cultivator.
No. 82,562. Patented Sept. 29, 1868.
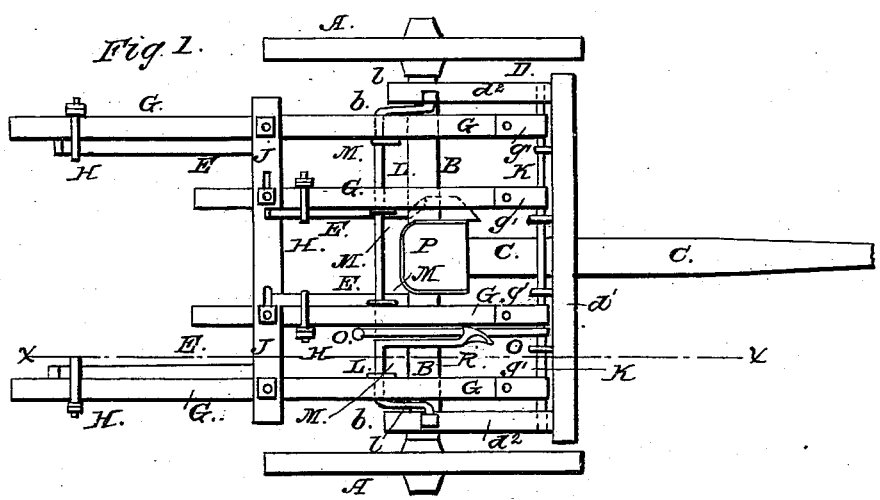
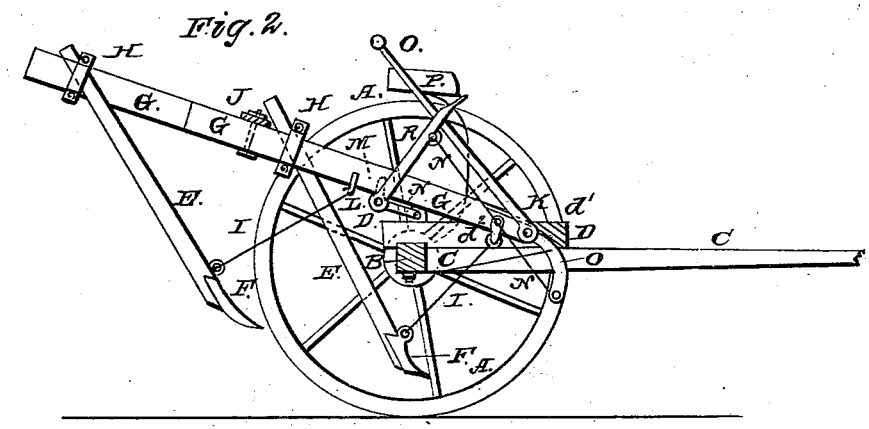
Witnesses:
Wm A Morgan
G. C. Cotton
Inventor:
J. C. Stroud
per Munn
Attorneys

United States Patent Office.

J. C. STROUD, OF LOCKHART, TEXAS.

Letters Patent No. 82,562, dated September 29, 1868.

---

IMPROVEMENT IN CULTIVATORS.

---

*The Schedule referred to in these Letters Patent and making part of the same.*

---

TO ALL WHOM IT MAY CONCERN:

Be it known that I, J. C. STROUD, of Lockhart, in the county of Caldwell, and State of Texas, have invented a new and useful Improvement in Cultivators; and I do hereby declare that the following is a full, clear, and exact description thereof, which will enable those skilled in the art to make and use the same, reference being had to the accompanying drawings, forming part of this specification, in which—

Figure 1 is a top or plan view of my improved cultivator.

Figure 2 is a vertical section of the same, taken through the line $x\ x$, fig. 1.

Similar letters of reference indicate corresponding parts.

A are the wheels, B is the axle, and C is the tongue of the cultivator.

D is a frame, consisting of a cross-bar, $d^1$, and two side-bars, $d^2$, which is securely attached to the axle B and tongue C, as shown in the drawings.

E are the plow-standards, to the lower end of which the plows or cultivator-teeth F are attached, and which are securely attached to the beams G by the clamps H and brace-rods I.

The beams G are of different lengths, and are kept in their proper relative position by being connected by a cross-bar, J, to which the rear parts of the said beams are bolted.

The bolts that secure the central beams, G, to the cross-bar J, pass through slots in said cross-bar, so that the said beams may be adjusted nearer together or farther apart, as may be required.

The forward ends of the beams G have straps, $g'$, attached to them, which pass around the rod K, so as to pivot the said beams G to the forward part of the frame D.

The pivoting-rod K may be connected to the frame D by passing through eye-bolts attached to said frame, or in any other secure and convenient manner.

L is a rod, which passes through holes in the lower ends of short straps, M, the upper ends of which are pivoted to the beams G.

Upon the ends of the rod L are formed cranks $l$, the crank-arms of which are pivoted to the rear parts of the side-bars $d^2$ of the frame D, by eye-bolts or other suitable bearings.

Upon the pivoting crank-rod L is formed, or to it is attached, a lever-arm, R, having a catch formed upon its upper end.

N is a bar or rod, the upper end of which is pivoted to the lever R, and the lower end of which is pivoted to the lower end of the lever O.

The lever O is pivoted to the rod K, and its upper end extends up into such a position that it may be conveniently reached and operated by the driver from his seat, P.

By this construction, by drawing the upper end of the lever O back, the plows will be raised from the ground, and by catching the upper end of the lever O upon the catch formed upon the upper end of the lever-arm R, the plows will be held away from the ground for any desired length of time, so that the cultivator may be conveniently moved from place to place.

I claim as new, and desire to secure by Letters Patent—

1. Adjustably connecting the plow-beams G with each other, by means of the slotted cross-bar J, to which said beams are bolted, substantially as herein shown and described and for the purpose set forth.

2. Pivoting the plow-beams G to the stationary frame D, by means of the pivoting-rod K and the pivoting crank-rod L, substantially as herein shown and described and for the purpose set forth.

3. The combination of the hand-lever O, connecting-rod or bar N, and lever-arm R, with each other and with the rods K and L, by which the plow-beams G are pivoted to the frame D, substantially as herein shown and described and for the purpose set forth.

J. C. STROUD.

Witnesses:
J. S. EVANS,
D. N. McLEAN.